Figure 1:
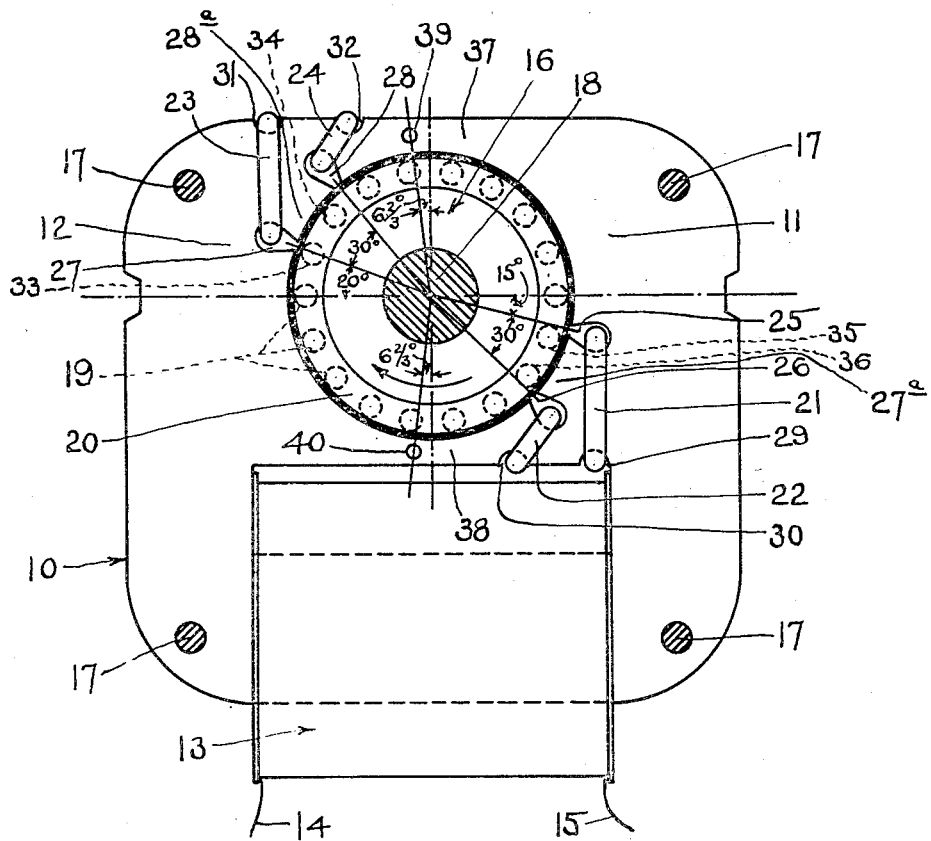

Nov. 23, 1948.　　　　　E. W. BALLENTINE　　　　　2,454,589

SHADED POLE MOTOR AND THE LIKE

Filed Aug. 2, 1945　　　　　　　　　　　　　　2 Sheets-Sheet 1

INVENTOR.
Earle W. Ballentine,
BY
Atty.

Nov. 23, 1948.   E. W. BALLENTINE   2,454,589
SHADED POLE MOTOR AND THE LIKE

Filed Aug. 2, 1945   2 Sheets—Sheet 2

INVENTOR.
Earl W. Ballentine,
BY
ATTY.

Patented Nov. 23, 1948

2,454,589

UNITED STATES PATENT OFFICE 2,454,589

SHADED POLE MOTOR AND THE LIKE

Earle W. Ballentine, Wilmette, Ill., assignor to Russell Electric Company, Chicago, Ill., a corporation of Illinois Application August 2, 1945, Serial No. 608,419

13 Claims. (Cl. 172—278)

This invention relates to improvements in induction type motors, and the like. Specifically, the invention relates to improvements in shaded pole single-phase motors, as will hereinafter appear. In order that the present improvements may be more readily understood, I shall first explain briefly certain underlying characteristics of induction motors of the shaded pole type, and shall then show how my improvements modify previously known motors of this and other types, and improve their characteristics.

In the induction type motor the torque developed is due to reaction between the rotating field of the stator and the currents induced in the rotor or portions thereof.

When a rotor tooth is in direct registry with a stator tooth, the condition of minimum reluctance between the stator and rotor exists; whereas when a rotor tooth is directly between two stator teeth, a maximum reluctance condition will exist. The strength of the field of flux between any given stator tooth and the rotor varies inversely as the reluctance, and likewise the physical pull exerted between these parts depends on the strength and amount of such field of flux. Thus the pull existing between such elements, and the direction of that pull, will vary greatly and with great rapidity during rotor rotation. As a rotor pole approaches a stator pole the magnetic pull between these elements tends to draw the rotor forwardly, assisting its rotation, whereas, as the rotor pole leaves the stator pole this magnetic pull acts against the rotation of the rotor, tending to slow down the rotor.

If more than one rotor pole reaches its condition of registry with a stator pole at any given instant the foregoing effect is correspondingly magnified. When such synchronous registry occurs due to the relative conditions above explained there occurs what may be called "cogging" or "meshing" or "gearing" during the rotor rotation. This is a very noticeable effect due to the considerable and regular rapid variation of torque incident to such synchronous registry of the rotor and stator poles; and besides producing a noticeable hum in the running of the motor this synchronous registration materially reduces the starting torque available with a given current, or increases the starting current of various forms of induction motors, for a given starting torque. It also materially reduces the torque which may be developed by such motors at all running speeds, or conditions of slip.

In the case of single phase shaded pole motors there are provided on each stator pole piece one or more low resistance shortcircuited coils or windings which embrace only a portion of the pole pieces on which they are placed. These windings serve to produce the effect of a rotating field in the stator field element due to the fact that the currents in these shortcircuited coils are lagging with respect to the main field winding currents supplied from the single phase input line. It has heretofore been customary to place such shading coils of shading pole motors symmetrically on all of the stator pole pieces of such motors; and furthermore such symmetry has existed both as between the locations of the shading coils on the stator pole pieces and also as between the shading coils and the rotor bars or windings. The result has been a great aggravation of the deleterious effects of "cogging," and has resulted in a noticeable reduction of available torque, especially at starting, and also a noticeable increase of starting current for a given torque, as compared to normal running current.

According to the principal feature of my present invention I so place and form the slots or tunnels for the shading coils in opposite poles of the stator (magnetically) that registry of the rotor slots or tunnels occurs successively with these slots or tunnels of the stator, and not simultaneously as heretofore; and when two or more slots or tunnels are provided in each or any given pole piece of the stator, I so place these that registration of rotor slots or tunnels with them will also occur successively, and not simultaneously as heretofore. By this means the "cogging" effect due to registration of any given rotor slot or tunnel with a slot or tunnel of the stator field poles occurs individually to that particular rotor slot or tunnel with a single slot or tunnel of the stator, and so on for all the rotor slots or tunnels as compared to all the stator slots or tunnels.

I furthermore so arrange the several slots or tunnels of the stator pole pieces that as any given slot or tunnel of the rotor is approaching a given stator slot or tunnel some other rotor slot or tunnel is receding from a given stator slot or tunnel, so that as between these two there is produced a neutralizing or cancelling effect, the pulls (rotationally) exerted between these two rotor slots or tunnels and the adjacent stator slots or tunnels being in opposite directions (rotationally), and therefore cancelling out to a greater or lesser extent. Thus, not only have I made provision for elimination of the synchronizing effects heretofore occurring, but I have also made provision for neutralizing or cancelling effects prior to and subsequent to exact registration of each rotor slot or tunnel with a stator slot or tunnel. The result is a maximum of benefit in the reduction or elimination of the "cogging" effects.

Shaded pole motors embodying the features heretofore explained have shown increases of starting torques of such motors as great as 35% or more; and with corresponding lessening of starting currents, and with corresponding increase of torque efficiency (torque efficiency being defined as torque developed per ampere of current input). My improved motors have also shown increases of running torque of as much as 25-30% as compared to performance of similar sizes of shaded pole motors not provided with the improvements herein disclosed.

A further benefit produced by my improvements herein described is that by my improvements the "torque oscillations" developed in the rotor is reduced since a more uniform torque is developed. Such reduction of "torque oscillation" also results in substantial reduction of vibration in the running of my improved motors as compared to those of previous and conventional designs.

Specifically, I have herein shown the features of my present invention as applied to the case of a squirrel cage type single phase shaded pole motor, but in so doing I wish it understood that I do not thereby intend to limit myself, except as I may do so in the claims to follow.

In the drawings:

Figure 1 shows a typical motor embodying the features of my present invention, being a shaded pole, single phase induction type motor with eighteen bars carried in corresponding tunnels in the rotor, and with two shading coils on each field pole; and Figures 2, 3, 4 and 5 show schematically four successive positions of a rotor as compared to the several stator slots or tunnels, when using the features of the present invention, and with said stator slots or tunnels placed asymmetrically with respect to each other and with respect to the rotor slots or tunnels.

Referring first to Figure 1, the motor therein shown includes the stator or field element 10 of bipolar form with the two poles 11 and 12. The field winding or coil 13 is placed on the mid-section of this field element according to conventional practice, and is excited by single phase current input, through the terminals 14 and 15. The rotor 16 is journalled between the pole pieces 11 and 12, the near bearing being removed so as to reveal the rotor construction, and its relation to the field pole pieces, and especially the relationship between the shading coils and the rotor bars. The stator or field element's core is formed from laminations of proper form, held together by the through bolts or pins 17, according to usual practice. Likewise, the rotor is formed of laminations of suitable form mounted on the shaft or arbor 18, also according to usual practice.

The rotor is provided with the several rotor bars 19, extending through suitable tunnels in the rotor core; and the ends of these bars are short-circuited at each end of the rotor by the end rings such as 20, according to usual practice. In the rotor shown in Figure 1 there are 18 rotor bars, being an even number.

The shading coils 21 and 22 are placed on the pole piece 11 and the shading coils 23 and 24 are placed on the pole piece 12. These coils respectively embrace portions of the sides of the pole pieces on which they are placed, according to usual practice; but I shall presently show how the placing or spacing of these coils is distinctive in the present case as compared to previous arrangements, and how this distinctiveness is related to the rotor bars 19. Conveniently each shading coil comprises a single turn or embrasure of relatively large cross section conductor, thus producing a very low resistance shortcircuited current path lying across the flux of a portion of the pole piece. Conveniently, also each shading coil is received in a slot extending across the pole piece with which such coil is related, so as to bring one arm of such coil close to the air gap between the stator pole piece and the surface of the rotor; these being the slots 25 and 26 for the coils 21 and 22 on the pole piece 11, and the slots 27 and 28 for the coils 23 and 24 on the pole piece 12. In the arrangement shown these coil carrying openings are true slots, reaching down into communication with the air gap, so the shading coils are distinctly related in positioning to the surface of the pole pieces; and furthermore, these slots provide definite pole teeth or the like 27$^a$ and 28$^a$ reaching directly to the air gap. The outer sides of these shading coils are conveniently placed in the grooves 29, 30, 31 and 32 formed in the surface of the pole pieces or the field structure.

Here it is noted that the presence of the tunnels wherein the rotor bars are placed results in the production of a surface condition in said rotor such that said rotor is non-uniform magnetically, the spaces between these tunnels corresponding to the teeth of a slotted rotor. Also that these hypothetical teeth of the rotor bear definite relations to the teeth of the stator pole pieces so that such hypothetical rotor teeth may be compared in angular position to the teeth of the stator poles.

In Figure 1 I have shown the stator slots positions by means of radial lines. The stator teeth positions may be considered as lying directly between these radial line positions. The rotor bars are also shown by the dotted circles in Figure 1, being so shown as these bars are end connected together by the end rings 20. The tunnels which receive these rotor bars are of course concentric with such rotor bars, so the rotor tunnel locations are thus shown. The rotor teeth may be considered as lying directly between such rotor tunnel locations, and may thus be compared in angular location to the stator teeth. The "cogging" effects may thus be discussed either with reference to the stator teeth or the stator slots, and with reference to the rotor teeth or the rotor tunnels.

Now it is noted that in the arrangement of Figure 1 the angular embracement between the slots 25 and 26 is the same as the angular embracement between the slots 27 and 28, being 30 degrees between the slots 25 and 26, and 30 degrees between the slots 27 and 28. It is also noted that the number of rotor bars being 18, the angular embracement between successive rotor bars is 20 degrees, different from the embracements between the pairs of shading coils for the two pole pieces, which is 30 degrees. It is also noted that the slot 25 is set at 15 degrees from the horizontal line, whereas the slot 27 is set at 20 degrees from the horizontal line; so these slots 25 and 27 are out of line from each other by the amount of 5 degrees. Such misalignment will also be found to exist as between the slots 26 and 28. Consequently, if we set the rotor in such a position as shown in Figure 1, where one of the rotor bars is directly in line with the shading pole slot 27, it will be found that all the other slots are at that time out of alignment with the closest rotor bars as follows: Slot 26 out of alignment with a rotor bar by 5 degrees; slot 28 out of alignment with a rotor bar by 10 degrees; and slot 25 out of alignment with a rotor bar by 15 degrees (measuring in the same rotational direction as other measurements).

With the foregoing arrangement, and also assuming rotation of the rotor clockwise, the next bar to come into registry with a slot would be the bar reaching the slot 26, all other bars having moved 5 degrees clockwise also. At the next 5 degree movement a bar would come opposite to the slot 28, at the next 5 degrees a bar would come opposite to the slot 25, and at the next 5 degrees a bar would come opposite to the slot 27, commencing a repetition of the cycle. Thus, with the arrangement shown, the cycle would be the slot 27, slot 26, slot 28, and finally slot 25, then repeating and so on. Thus, also there is registration of bars with slots, individually each 5 degrees instead of each 20 degrees as would be the case if the mis-alignment herein disclosed did not exist, thereby increasing the frequency of such registrations, or conversely reducing the disturbances in torque due to variations of positioning of bars with respect to shading coils, and variations of rotor slots or tunnels with respect to stator slots or tunnels.

Examining Figure 1 in further detail, it will be seen that rotor bars 33 and 34 adjacent to the field pole 12 stand in different phase positions with respect to the adjacent shading coil slots 27 and 28; and that likewise the rotor bars 35 and 36 stand in different phase positions with respect to the adjacent shading coil slots; and, assuming clockwise rotation of the rotor as indicated by the arrow thereon, the bar 33 is passing from registry with the slot 27, while the bar 34 is approaching registry with the slot 28; and the bar 35 is leaving the slot 25 while the bar 36 is approaching the slot 26. Thus, at the instant depicted in Figure 1 the magnetic effects due to variation of reluctances due to the tunnels carrying the bars 33 and 34 are neutralizing each other in the sense that said effects act in opposite directions. Likewise the effects due to variation of reluctances due to the tunnels carrying the bars 35 and 36 are neutralizing each other.

Another way of considering the matter is as follows:

The tooth lying between the tunnels of the rotor bars 35 and 36 is in alignment with the tooth lying between the stator slots 25 and 26; the tooth lying between the rotor tunnels carrying the bars 33 and 34 is not yet in exact alignment with the tooth lying between the stator slots 27 and 28, but is approaching such alignment. When the rotor has progressed 5 degrees from the position shown in Figure 1 the conditions as between the two sides of the rotor will have reversed, the tooth between the tunnels 33 and 34 having progressed to exact alignment with the tooth between the stator slots 27 and 28, and the tooth between the tunnels 35 and 36 having progressed from exact alignment with the tooth between the stator slots 25 and 26 by an amount equal to the displacement of the tooth between the rotor tunnels 33 and 34 from its previous position with respect to the stator tooth between the stator slots 27 and 28. In other words, the balancing condition exists as between the two sides or halves of the machine as well as on each half or side thereof.

Analysis of the progression of alignments, approaches to alignment, and recessions from alignment, will show that as the rotor continues its rotation there will be exact alignments when conditions of balance exist as between other groups of teeth; and that as the condition of exact alignment is approached between any given rotor tooth and a stator tooth, the condition of misalignment at another location will be changing in such a manner that such change will offset that created by the approaching alignment first referred to. In other words, a condition of balance is created when the rotor and stator are considered in their total entirety. For this reason it will be found that motors embodying the features herein disclosed operate substantially without any "cogging" effect, they have much improved starting characteristics, and better running characteristics as compared to previous motors of conventional types, and that motors embodying my present improvements present other valuable features not heretofore known.

Attention is called to the fact that in the design of motor shown in Figure 1 both the stator poles 11 and 12 are joined by the relatively thin or shallow connections 37 and 38 of magnetic material. A portion of the flux flowing through the stator field as a whole will flow through these connections; but it is noted that I have provided the holes 39 and 40 extending through these reduced section connections. These holes 39 and 40 serve to reduce the cross sections of these connections 37 and 38, respectively, so that the direct flux flow through these sections can be calibrated or adjusted accurately by drilling these holes of correct size. The stator is designed so that these connections 37 and 38 are worked at high flux values, thereby throwing the desired volume of flux through the air gap and across the rotor. By drilling these holes of proper size this action can be properly ensured.

The effect of this concentration of flux occasioned by the presence of these holes 39 and 40 is comparable to a further phasing action as respects the "cogging" effect heretofore explained since, by setting these holes off-center as shown in Figure 1 it is possible to modify the positions at which the flux will enter and leave the rotor, in comparison to the positions of the stator slots in space. In the arrangement shown these holes are off-set to the left by the amount of 6⅔ degrees each, that is, each of these holes lies 6⅔ degrees to the left of the line normal to the broken line heretofore referred to. Thus, the angle between the stator slot 28 and the hole 39 is 33⅓ degrees while the angle between the stator slot 26 and the hole 40 is 51⅓ degrees, so there is a difference of 17⅔ degrees as between these two amounts of separation. This amount, 17⅔ degrees is not a direct multiple or portion of the 20 degree separation between rotor tunnels, so a further beneficial effect is produced in the sense that even the flux diverted and controlled through the rotor by reason of these holes 39 and 40 is non-symmetrical with respect to the positions of the rotor tunnels.

The successive relations between the rotor tunnels and the several rotor slots are shown in Figures 2, 3, 4 and 5 for the rotor and stator arrangement shown in Figure 1; and by comparing these successive figures it is possible to more readily understand how the successive alignments and misalignments of rotor tunnels and stator slots occur, and to see how this improved motor design serves to avoid or reduce "cogging." In comparison thereto, the dotted lines in Figures 2, 3, 4 and 5 show corresponding rotor and stator positions in the case of a motor design having symmetrical slots; and these figures show most emphatically how such "cogging" is made possible by the simultaneous alignment of rotor and stator teeth, or the spaces between rotor and stator slots or tunnels, and how, as such alignment is approached or discontinued by the rotor rotation, such previous design has failed to make provision for balancing or cancelling out the conditions of unbalance at the two sides of a selected slot or tunnel, or the teeth of the rotor and stator.

Figure 2:
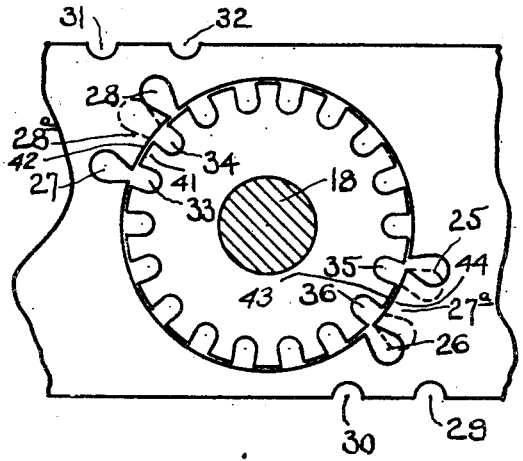
Figure 3:
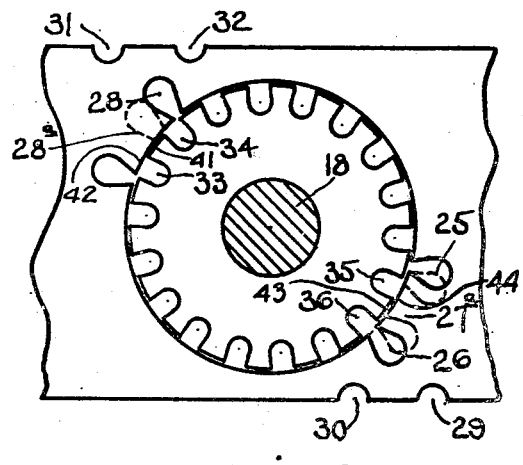

In the position shown in dotted lines of Figure 2 the rotor tooth 41 registers directly with the stator tooth 42 and the rotor tooth 43 registers directly with the stator tooth 44, so that both these pairs of teeth exert a maximum of attraction for each other at the instant depicted in Figure 2. In passing to the position of Figure 3 the rotor teeth 41 and 43 must be drawn away from the teeth 42 and 44 against the attraction existing between them, and there exists no counterbalancing force anywhere to counterbalance this condition. Thus we have in the position of Figure 3 a severe condition producing "cogging."

Figure 4:
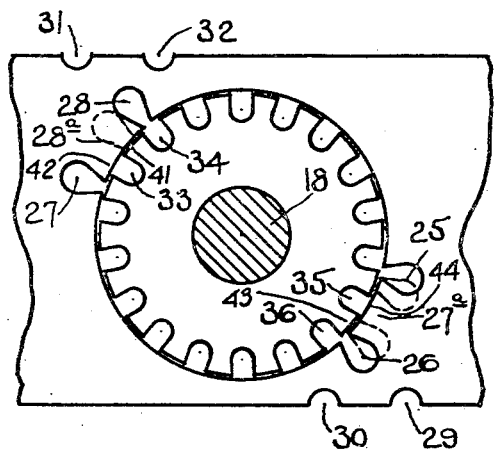
Figure 5:
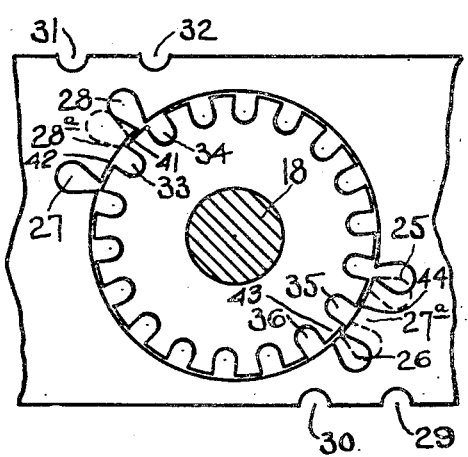

When the position of Figure 4 is reached each rotor tooth has come opposite to a stator slot, so that the attraction between rotor and stator has fallen to its minimum value. Also, the condition previously existing, of having to draw the rotor teeth away from stator teeth, has ceased, and the attraction between each rotor tooth and a succeeding stator tooth begins to rise, tending to draw the rotor in the direction of rotation thereof. Thus the previous condition of having to pull each rotor tooth away from a stator tooth has given way to the condition of a rising attraction between each rotor tooth and a succeeding stator tooth. This rising condition will continue until it reaches a maximum when each rotor tooth comes again into exact registry with a succeeding stator tooth.

It is thus seen that this previous and conventional design of motor presents the most objectionable set of conditions tending to produce "cogging," and is in direct opposition to the conditions which exist in my improved motor design as herein set forth.

I wish to point out that there is no limitation in the numbers of tunnels or slots to be used in the rotor, or in the numbers of tunnels or slots for accommodation of the shading coils or other coils of the stator, other than that there shall be misalignment such as herein disclosed as between these two sets of tunnels and/or slots, and the need of so proportioning these numbers that such mis-alignment may be produced.

It may be generally stated that my improved motors include stator and rotor elements having qualities which are non-homogeneous magnetically, such non-homogeneity being produced in various manners as by the slots or tunnels wherein are received the conductor bars or windings; and that my improvement consists in forming such non-homogeneities of the rotor and stator elements asymmetrical with respect to each other, the non-homogeneities of these two elements, individually considered being regularly spaced around the axis of rotation. It will also be noted that the features of my present invention may be applied in various manners. It will be understood that with the arrangement described above an almost perfect balancing effect is obtained, which permits of substantially complete elimination of all "cogging" effects.

While I have herein shown and described only a single embodiment of the features of my present invention, except as I have also pointed out certain modifications thereof, above, still I do not intend to limit myself thereto, nor as modified in said statement, except as I may do so in the claims to follow.

I claim:

1. A shaded pole single-phase motor of the induction type, having its rotor provided with slots or tunnels even in number and conductors located therein, and having the poles of its stator provided with slots or tunnels for shading coils, and conductors located therein, said stator slots or tunnels in each pole of said stator being separated by the same amount as those of the other poles so as to define in each pole a stator tooth said stator tooth of one pole being asymmetrically disposed relative to the stator tooth of another pole, the spacing between the stator slots in each pole being different from the spacings of the rotor slots or tunnels.

2. A motor as defined in claim 1, wherein the stator teeth in opposed poles are non-opposite from each other magnetically by a fraction of the spacing between rotor slots or tunnels.

3. A motor as defined in claim 1, wherein the spacings of the slots or tunnels of the stator poles are so arranged in the stator poles that the slots or tunnels of the stator poles are asymmetrical with respect to each other.

4. A motor as defined in claim 1 having two stator poles, wherein the spacings of the slots or tunnels of the stator poles are so arranged in the two stator poles that the slots or tunnels of the two stator poles are asymmetrical both with respect to each other and with respect to the spacings of the rotor slots or poles.

5. A single phase shaded pole motor having a rotor and a stator, said rotor being provided with an even number of slots or tunnels, conductors located therein, said slots or tunnels being uniformly spaced around the axis of rotation of said rotor, and each pole of the stator field element being provided with at least two slots or tunnels, and shading coils located therein, said stator slots or tunnels of each pole being separated from each other by an amount greater than the separation between consecutive rotor slots or tunnels, and each stator slot or tunnel being asymmetric with respect to a corresponding stator slot or tunnel of the opposite stator field pole by an amount different from the spacing between consecutive rotor slots or tunnels.

6. A motor as defined in claim 5, wherein the slots or tunnels of each stator pole are separated from each other by an amount substantially equal to one and one-half times the separation between rotor slots or tunnels.

7. A motor as defined in claim 5, wherein the asymmetry between slots or tunnels of the two stator field poles is substantially one-fourth the separation between rotor slots or tunnels.

8. A motor as defined in claim 6, wherein the asymmetry between slots or tunnels of the two stator field poles is substantially one-fourth the separation between rotor slots or tunnels.

9. An induction type motor having a stator including a plurality of poles with at least one winding slot defined in each pole, a squirrel cage rotor including a plurality of rotor bars equally spaced around the circumference of said rotor, said winding slots being asymmetrically positioned relative to said rotor bars so that at any given instant the maximum number of rotor bars in registry with winding slots is one, and registry between rotor bars and winding slots upon operation of said motor occurs successively with respect to said winding slots.

10. An induction type shaded pole motor having a stator including two poles with two winding slots defined in each pole, a shading coil disposed in each slot, a squirrel cage rotor including a plurality of rotor bars equally spaced around the circumference of said rotor, said winding slots being asymmetrically positioned relative to said rotor bars so that at any given instant the maximum number of rotor bars in registry with winding slots is one, and registry between rotor bars and winding slots upon operation of said motor occurs successively with respect to said winding slots.

11. An induction type motor having a stator including a plurality of poles with at least one winding slot defined in each pole, a squirrel cage rotor including a plurality of rotor bars equally spaced around the circumference of said rotor, said winding slots being asymmetrically positioned relative to said rotor bars so that as any particular rotor bar is tending to move into registry with a winding slot some other rotor bar is moving out of registry with a winding slot whereby cogging effects are substantially eliminated by cancellation of the torques tending to produce cogging.

12. A shaded pole single-phase motor comprising a stator including a plurality of poles, a pair of winding slots positioned in each pole so as to define a stator tooth in each pole between said slots, a squirrel cage rotor including a plurality of tunnels defined therein equally spaced around the circumference of said rotor, said tunnels defining a plurality of rotor teeth, one between each pair of adjacent tunnels, said winding slots being asymmetrically positioned relative to said tunnels so that at any particular instant a rotor tooth is tending to move into registry with a stator tooth some other rotor tooth is moving out of registry with some other stator tooth whereby cogging effects are substantially eliminated by the cancellation of torques tending to produce cogging.

13. A shaded pole motor of the induction type having its pole pieces provided with shading coils including longitudinally extending conductors, a rotor including regularly spaced longitudinally extending conductors, the spacing between the longitudinally extending conductors of the shading coils of each pole piece being different from the spacing between the rotor conductors and the stator conductors being asymmetrically related to the rotor conductors so that at any given instant the maximum number of longitudinally extending shading coil conductors in registry with longitudinally extending conductors of said rotor is one.

EARLE W. BALLENTINE.

REFERENCES CITED

The following references are of record in the file of this patent:

UNITED STATES PATENTS

| Number | Name | Date |
| --- | --- | --- |
| 1,933,498 | Morrill | Oct. 31, 1933 |
| 1,992,971 | Stewart | Mar. 5, 1935 |

FOREIGN PATENTS

| Number | Country | Date |
| --- | --- | --- |
| 578,659 | Germany | June 16, 1933 |